United States Patent [19]
Xu et al.

[11] Patent Number: 6,157,340
[45] Date of Patent: Dec. 5, 2000

[54] ADAPTIVE ANTENNA ARRAY SUBSYSTEM CALIBRATION

[75] Inventors: Guanghan Xu; Xinguang Xu; Fuqi Mu; Daniel Wee; Yu Xia, all of Austin, Tex.

[73] Assignee: Cwill Telecommunications, Inc., Austin, Tex.

[21] Appl. No.: 09/179,047

[22] Filed: Oct. 26, 1998

[51] Int. Cl.⁷ .................................. G01S 7/40; H01Q 3/26
[52] U.S. Cl. .................................................. 342/174; 342/368
[58] Field of Search ....................................... 342/368, 165, 342/174

[56] References Cited

U.S. PATENT DOCUMENTS

| | | |
|---|---|---|
| 5,530,449 | 6/1996 | Wachs et al. ........................... 342/174 |
| 5,546,090 | 8/1996 | Roy, III et al. . | |
| 5,809,063 | 9/1998 | Ashe et al. . | |

*Primary Examiner*—Thomas H. Tarcza
*Assistant Examiner*—Fred H. Mull
*Attorney, Agent, or Firm*—Conley, Rose & Tayon, P.C.

[57] ABSTRACT

A communication system having an adaptive antenna array subsystem generates calibration information for the adaptive array subsystem by measuring the amplitude and phase of modulated signals within the subsystem at the antenna array mount and at the back plane mount for the transmit and receive array. The calibration information is used to more accurately perform beamforming for both received an transmitted information signals. The communication system uses a time diversity duplex (TDD) synchronous code division multiple access (SCDMA) protocol for wireless communication between remote terminals and a base station. The calibration means uses a combination combiner and splitter having matched micro strip lines incorporated into a printed circuit board in either the antenna array mount or the back plane.

32 Claims, 3 Drawing Sheets

ADAPTIVE ANTENNA ARRAY SUBSYSTEM CALIBRATION

FIELD OF THE INVENTION

This invention relates in general to wireless communication systems having adaptive antenna arrays and more particularly to the calibration of subsystems of said communication systems.

BACKGROUND OF THE INVENTION

Smart antenna arrays, or adaptive antenna arrays are proving to have a distinct advantage in modern wireless communication systems. The array is capable of beamforming or directing a beam of radiated energy toward a desired receiver. This has the advantage of increasing the power available to the desired receiver. In code division multiple access (CDMA) systems this has proven even more advantageous because the interference received by another receiver in an adjacent area is significantly reduced relative to conventional omni-directional or sectored transmissions.

The beamforming process is simplified in a time division duplex (TDD) system because the communications to and from an adaptive antenna array occur on a common frequency albeit during different time slots. This enables the adaptive antenna to create a transmit beam pattern substantially equal to a beam pattern received by the antenna array. As opposed to a frequency division duplex (FDD) system where transmissions and receptions occur on different frequencies, having different propagation paths, the beamform of a TDD system is more accurately formed because the transmit and receive propagation characteristics are substantially the same.

An adaptive antenna array uses a multitude of transmitters and receivers, each coupled to a corresponding element of the antenna array. The received beamform is determined by measuring the power and relative phase of a desired signal received on each antenna element and its corresponding receiver. The transmit beam is formed by varying the relative phase and power of each signal transmitted by the multitude of transmitters and corresponding antenna elements.

In order to accurately form a desired beam, the gain and relative phase of each component of the adaptive array subsystem should be known to a reasonable degree of precision. Uncompensated differences in the gain and phase in the adaptive antenna array subsystem degrades the performance of the subsystem. Ideally the gain and phase characteristics are predetermined at the time of manufacture and are environmentally invariant. However, in reality these characteristics vary over time, in response to the environment and in response to servicing and replacement of components of the adaptive antenna array subsystem. Thus, what is needed is an apparatus for determining variations in gain and phase of components of an adaptive array subsystem and for producing a calibration signal in response thereto.

OBJECTS OF THE INVENTION

It is therefor an object of the invention to provide for the aforementioned need. Further objects are realized by the claims presented herein.

DETAILED DESCRIPTION OF THE INVENTION

Figure 1:
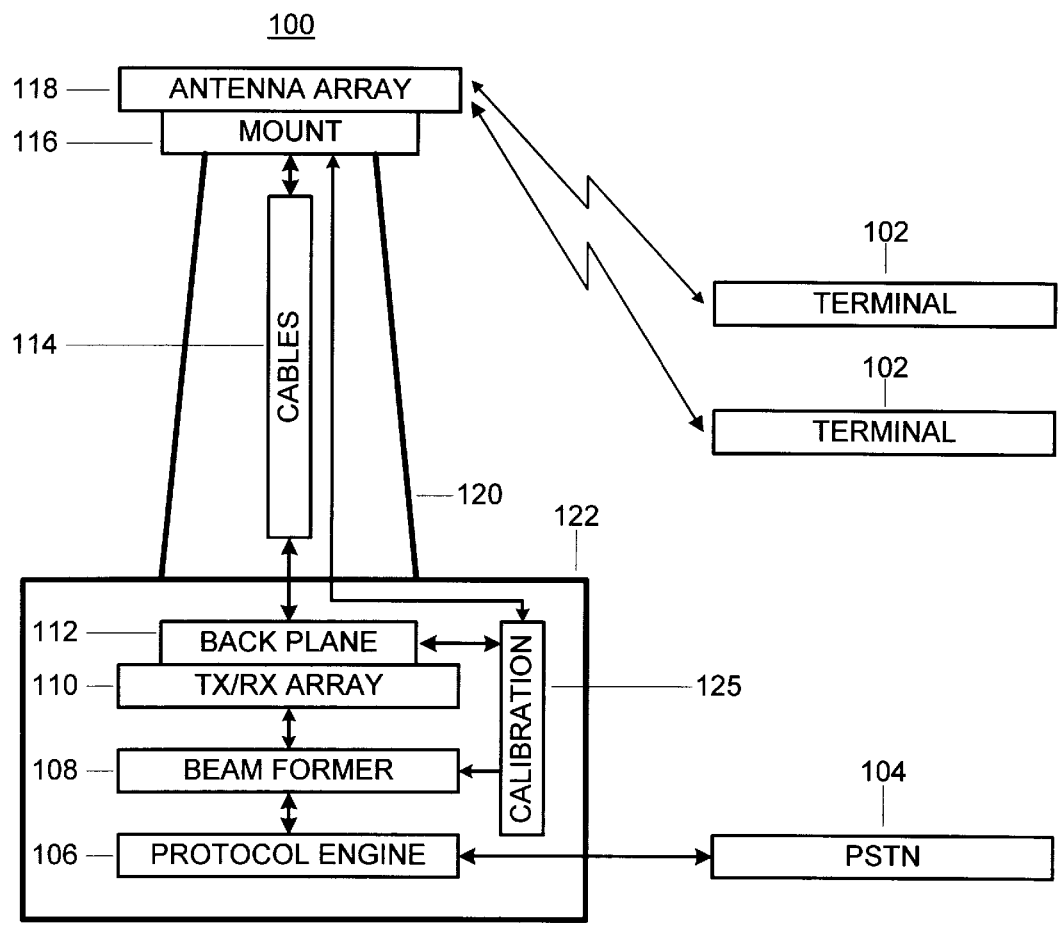
FIG. 1 shows an adaptive array antenna subsystem in communication with remote terminals and a telephone network.

FIG. 1 shows an adaptive array antenna subsystem in communication with remote terminals and a telephone network. Adaptive antenna array subsystem 100 is in wireless communication with remote terminals 102 and the public switched telephone network (PSTN) 104. In the preferred embodiment subsystem 100 facilitates telephone communication between the remote terminals 102 and the PTSN 104 using a synchronous CDMA (SCDMA) TDD communication system. Such a system is described in co-pending U.S. patent application Ser. Nos. 08/908,914 and 08/768,100 which are hereby incorporated by reference. Note that remote terminals 102 may themselves include adaptive antenna array subsystems or an omni-directional antenna.

The PSTN 104 is coupled to protocol engine 106 which converts between PSTN communications signals and SCDMA TDD communication signals. Beamformer 108 then generates transmit beamforms by varying the power and phase of signals transmitted by subsystem 100 and determines received signal beamforms by measuring the power and phase of signals received by subsystem 100. The transmit and receive array 110 is coupled to a back plane 112 and through transmission line cables 114 to a mount 116 for elements of the antenna array 118. In the preferred embodiment there are eight antenna elements in antenna array 118, eight cables 114 for uniquely coupling the antenna elements to eight corresponding transceivers in the transmit receive array 110 for coupling to the beamformer 108. Alternate adaptive antenna array embodiments may have more or less antenna elements and other corresponding components.

In a typical application subsystem 100 has antenna array 118 and its mount 116 components mounted atop a building or tower 120 or other advantageous position while components 106 to 112 are mounted in a housing 122 typically within an environmentally controlled interior space, and coupled to each other by transmission line cables 114. It should be appreciated that repair or replacement of a transmitter or receiver component 110 or replacement of a cable 114 or other servicing of the subsystem introduces changes which modify the gain and phase characteristics of the subsystem. Also, changes in the environment or aging also modify the gain and phase characteristics of the subsystem.

U.S. Pat. No. 5,549,090 to Roy, III et al., Aug. 13, 1996 describes a calibration method for compensating for gain and phase changes, said patent is hereby incorporated by reference. The calibration results in a modification of the gain and phase of the transmitted signal and a compensation for gain and phase changes induced during reception. However, the description requires an external reflecting repeater to perform calibration and is optimized towards FDD adaptive antenna array systems.

In the preferred embodiment, signals are measured at the back plane or at the output of housing 122 as well as at the antenna array mount 116 and calibration is performed by calibration means 125. This method allows gain and phase characteristics of subsystem 100 to be periodically and regularly determined without the requirement of an external reflector. Furthermore, the subsystem self testing may be performed in order that a failure alarm may be generated in response to characteristics of subsystem 100 exceeding parameters or operationally failing. Furthermore, since the preferred adaptive antenna array is fault tolerant, in that beamforming may still be performed, even though a transmitter or receiver or antenna element or cable may be defective, by removing the defective component and its corresponding components from the beamforming process. Calibration means 125 provides system component performance information allowing beamformer to perform accurate beamform determinations even though a component of the subsystem has failed by eliminating all components in the transceiver path associated with the failed component during beamforming. For example if a transmitter has failed, the information from the corresponding receiver may be eliminated in determining the corresponding transmit beamform. Alternately, if a receiver performance has degraded beyond specification, then its corresponding transmitter may be eliminated in generating the corresponding transmit beamform.

In the preferred embodiment, the subsystem operates in either a communication mode or in a calibration mode, the calibration mode being performed during intervals where communication with remote terminals in not required.

Figure 2:
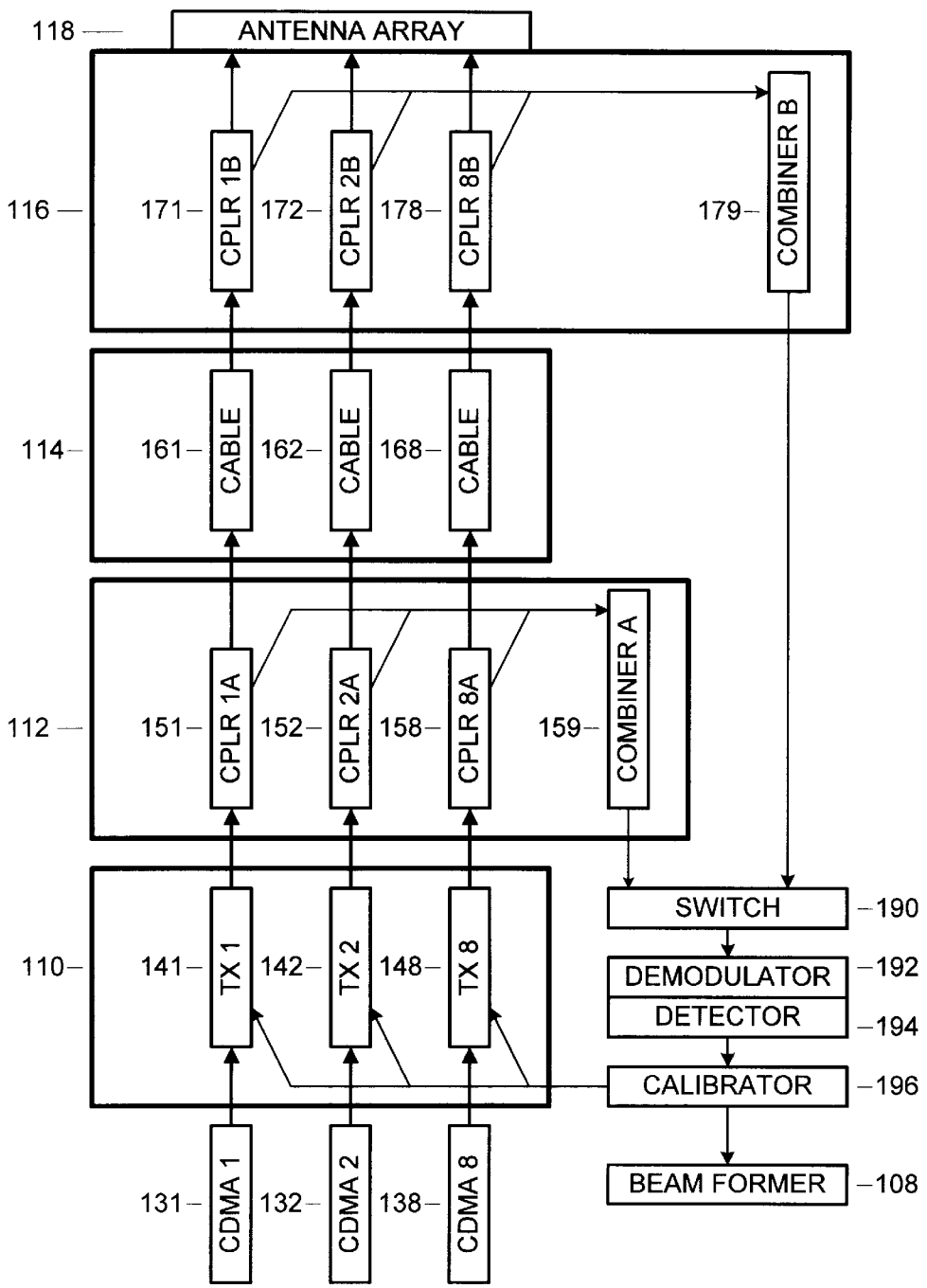
FIG. 2 shows a block diagram of the subsystem during calibration of the transmit portion of the subsystem.

FIG. 2 shows a block diagram of the subsystem during calibration of the transmit portion of the subsystem. Eight CDMA generators 131 to 138 synchronously generate eight separate orthogonal codes. For calibration, the codes generated by a signal generator comprising 131 to 138 need only have individually identifiable characteristics, such as eight sine waves of different frequencies. In the preferred embodiment protocol engine 106 is readily adapted for the generation of eight orthogonal SCDMA codes as used in the preferred calibration mode. The output of the signal generator is then modulated by a common carrier frequency and amplified by a multiplicity of transmitters 141 through 148, which are included in transmit receive array 110. The modulated signals then pass through a back plane 112 for coupling the signals to the corresponding cable 161 through 168, being members of cables 114. The back plane is a printed circuit board in housing 122 for accepting and mounting boards of transmit/receiver array 110. Preferably there is one transmitter and one receiver per board affixed to the back plane. While passing through the back plane, the modulated signals are combined in combiner A 159 including the use of couplers 151 through 158. While many different combiner topographies may be used, preferably, combiner 159 comprises all passive components and is preferably comprised of all micro strip lines to combine the multiplicity of modulated signals into one signal. Placing the micro strip lines on a common printed circuit board has the advantage of matching the micro strip lines in that changes in the characteristics of the printed circuit board either due to manufacturing variations or environmental variations change the gain and phase components of the combiner equally. This topography also has the advantage of maintaining a low cost when integrated into the subsystem 100 while providing matched performance. This has the further advantage of allowing for replacement of transceiver boards without modifying the gain and phase characteristics of the combiner because the signal coupling occurs on the back plane rather than the replacement transceiver board. Upon manufacture of the combiner components 151 through 159, the combiner is characterized and the modification to the amplitude and phase of combined signals is noted and stored as a predetermined result associated with the combiner for use in calibration and beamforming.

It should be appreciated that while combiner A is shown to be located on back plane 112 integrated into the housing 122, that alternate embodiments may have components 112 and 151 through 159 located external to housing 112 while remaining within the scope of the invention. For example combiner A could be located externally for factory calibration or as a separate component located in an installed equipment rack.

Cables 114 couple to the antenna array mount 116 for mounting antenna elements of antenna array 118. Similar to components 151 through 159, components 171 through 179 form a second combiner B at the antenna array. Couplers 171 through 178 couple modulated signals to combiner B which is composed of passive components, preferably including additional micro strip lines, which are impedance matched and included upon a common printed circuit board.

The combination of the first and second combiners A and B has the advantage of fault isolation. A failed component located within housing 122 will be detected by both combiners A and B while a failed component located beyond housing 122, such as a cable 161 through 168 or cable connector, will be detected by combiner B. This has the advantage of saving a field service technician from traveling to tower tops to repair components in the antenna array if the failure is located in a component within housing 122.

In alternate embodiments components of transmitters 141 through 148 may be located in close proximity to the antenna array to improve system design. This exposes the components to more sever environmental variations and makes the components more difficult to repair. For example the final stage of the power amplifier of each transmitter and/or a final mixer may be coupled between the cables 114 the antenna array mount 116. Since more components of subsystem 100 can be located atop a tower and close to antenna array 118, combiner elements 171 through 179 are even more advantageous in calibration and fault isolation applications.

Switch 190 selectively couples the combiners A and B to demodulator 192 which demodulates the combined modulated signals. Then detector 194 detects the amplitude and phase of each of the orthogonal CDMA codes. In the preferred embodiment the following formula shows a method of determining the gain and phase of each CDMA signal, $$a_i = \frac{1}{N}\sum_{i=1}^{N} s(n)c_i(n) \qquad (1)$$

where s(n) is the received signal sampled at the chip rate $c_i(n)$ is the i-th code and N is the spreading factor. $|a_i|$ is the amplitude and $\angle a_i$ is the phase of the CDMA signal. Since $c_i(n)$ and $c_j(n)$, $i \neq j$, are orthogonal in (1), all the other components from different transmitters can be canceled out leaving only the i-th component from the i-th transmitter.

Detector 194 may use components of protocol engine 106 during the calibration mode of operation. After detecting the amplitude and phase of each of the orthogonal codes, calibrator 196 determines how to compensate the subsystem. For example, for large variations in amplitude (due for example to field replacement of a defective transmitter, the gain of a corresponding transmitter may be adjusted to equalize the amplitude of all the modulated signals. Thereafter, a calibration result is made available to beamformer 108 to add an additional transmitter calibration factor to its beamforming algorithms.

Figure 3:
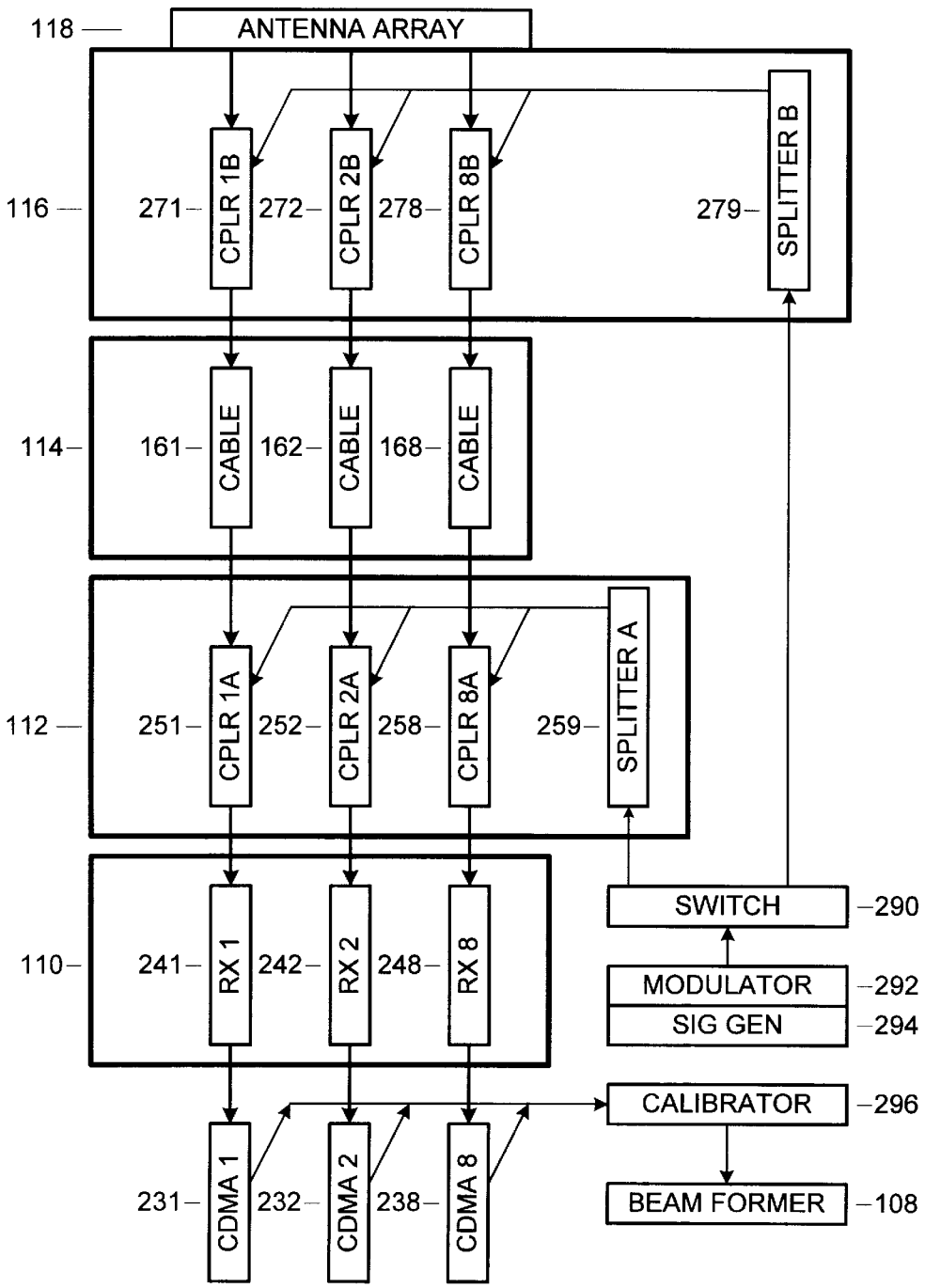
FIG. 3 shows a block diagram of the subsystem during calibration of the receive portion of the subsystem.

FIG. 3 shows a block diagram of the subsystem during calibration of the receive portion of the subsystem. Signal generator 294 preferably generates a spread spectrum code equivalent to a SCDMA code generated by protocol engine 106 in order that components of protocol engine 106 may be used during receiver calibration. Alternately, any signal may be used that allows determination of amplitude and phase, such as a sine wave. The signal is then modulated by modulator 292 and made available to switch 290 which selectively routs the modulated signal to either splitter A or splitter B. Splitter B 279 is preferably incorporated within antenna mount 116 and couplers, preferably micro strip lines, 271 through 278 for coupling the modulated signals with signals received on antenna array 118.

It should be appreciated that in the preferred TDD mode of operation of the communication subsystem, the receive calibration mode can be operated during a time slot where subsystem 100 is normally transmitting when in communication with remote terminals. This reduces the likelihood that interfering signals will be received by antenna array 118.

In this mode a time division duplex controller (not shown) controls communication of the subsystem with a remote terminal and causes the subsystem to transmit information to the remote terminal in transmit time slots occurring at periodic intervals and receive information from the remote terminal in receive time slots, the receive time slots interposed between the transmit time slots. The receiver calibration mode is operated in response to an absence of communication with the remote terminal to enable receive calibration mode during at least one transmit time slot.

Modulated signals from the antenna array mount 116 are coupled through cables 144, including cables 161 through 168, to back plane 112. Back plane 112 includes splitter A, through 259, including a corresponding multiplicity of couplers, preferably micro strip lines, allowing modulated signals split by splitter A to be coupled to the back plane in response to switch 290 selecting splitter A rather than splitter B. Coupled through either splitter A or splitter B, the modulated signals are coupled to transmit and receiver array 100 which includes a multiplicity of receivers 241 through 248 which then amplify and demodulate the modulated signals. A multiplicity of detectors 231 through 238 then determine the amplitude and phase of the signals received by each of the receivers. Detectors 231 through 238 may utilize components of protocol engine 106 to determine the amplitude and phase of spread spectrum signals. The amplitude and phase of each signal detected by detectors 231 through 238 is then processed by calibrator 296 to produce a calibration result utilized by beamformer 108 in determining beamforms received while communicating with remote terminals.

As can be observed from FIG. 2 and FIG. 3, the calibration means 125 of FIG. 1 includes components 131 through 138, 151 through 159, 171 through 179, 190 through 196, 231 through 138, 251 through 259, 271 through 279 and 290 through 296. Many of these components may be shared with components of the protocol engine 106 and beamformer 108.

As with combiners A and B, splitters A and B are characterized at time of manufacture and have a predetermined modification to the gain and phase of the modulated signal. Calibrators 196 and 296 take the predetermined gain and phase modifications into account when determining a calibration result. Furthermore, as with combiners A and B, splitters A and B are passive and preferably comprised entirely of micro strip devices mounted on respective common printed circuit boards resulting in matched characteristics that vary consistently with manufacturing variations and environmental conditions.

Furthermore, in the preferred embodiment, transmitters 141 through 148 and corresponding receivers 241 through 248 are paired to make corresponding transceivers having a switch for selectively coupling either transmitter or receiver to an antenna element during a corresponding TDD time slot. In this preferred topography, combiner A components 171 through 179 and splitter A components 271 through 279 are correspondingly identical components. That is, the device operates as a combiner during transmit calibration and as a splitter during receive calibration. Combiner B and splitter B may similarly be identical in the preferred TDD application. This has the additional advantage of canceling characterization and environmental variations in the otherwise separate splitters and combiners as the beamformer utilizes a ratio of the transmit calibration result and the receive calibration result.

Furthermore, as with the transmitters, alternate embodiments may incorporate a portion of each of the receivers 241 through 248 in close proximity with the antenna array. For example, a receiver's low noise amplifier and/or first mixer may be located between the cables 114 and antenna array mount 116. Such a location exposes those components to more severe environmental conditions as well as making repair more difficult. Consequently, as in the corresponding alternate embodiment for the transmitters 141 through 148, the locations of splitters A and B further facilitates calibration and fault isolation of receivers 241 through 248.

Demodulator 192 and modulator 292 are shown as separate components. In an alternate embodiment, demodulator 192 could also function as one of the receivers 241 through 248 and modulator 292 could operated as one of the transmitters 141 through 148. In the preferred embodiment these are not shared with the transmit and receive array, modulator 292 and demodulator 192 have reduced gain and are specifically designed for use during calibration. However, it is contemplated that these components could be eliminating by sharing components of the transmitter and receiver arrays.

The calibration of this invention is as described herein is not limited to a base station application of an adaptive antenna array subsystem. It is contemplated that this invention may be readily extended to antenna array remote terminal devices.

Thus, what has been provided is an apparatus for determining variations in gain and phase of components of an adaptive array subsystem and for producing a calibration signal in response thereto.

We claim:

1. An antenna array subsystem comprising:
   a signal generator for simultaneously generating a multiplicity of information signals, each of the multiplicity of information signals having individually identifiable characteristics;
   a multiplicity of transmitters coupled to said signal generator for producing a corresponding multiplicity of modulated signals modulated at a common carrier frequency;
   a combiner coupled to said multiplicity of transmitters for combining the multiplicity of modulated signals to produce a combined modulation signal;
   a demodulator coupled to said combiner for demodulating the combined modulation signal to produce a demodulated signal including the multiplicity of information signals; and
   a detector coupled to said demodulator for processing the demodulated signal to determining a power level and a phase for each of the multiplicity of information signals.

2. The subsystem according to claim 1 wherein said signal generator includes a multiple frequency generator and each of the multiplicity of information signals includes a sine wave having a unique frequency, and said detector includes a multiple frequency detector for determining a power and a phase for each of the multiplicity of information signals.

3. The subsystem according to claim 1 wherein said signal generator includes a code division multiple access generator and each of the multiplicity of information signals comprises an orthogonal code, and said detector includes a code division multiple access detector for determining a power and a phase for each of the multiplicity of information signals.

4. The subsystem according to claim 1 further comprising a calibrator coupled to said detector for generating a transmit calibration result for compensating for power and phase characteristics of the subsystem in response to each of the multiplicity of information signals detected by said detector.

5. The subsystem according to claim 4 wherein said calibrator is coupled to said multiplicity of transmitters and at least one of said multiplicity of transmitters has a gain which varies in response to the transmit calibration result.

6. The subsystem according to claim 4 wherein said calibrator is coupled to said signal generator and at least one of said multiplicity of information signals has a phase which varies in response to the transmit calibration result.

7. The subsystem according to claim 4 wherein said combiner has a predetermined gain and phase modification upon each of the modulated signals and further wherein said calibrator accounts for the predetermined gain and phase modification in the generation of the transmit calibration result.

8. The subsystem according to claim 7 wherein the subsystem is coupled to an antenna array for transmitting information to a remote receiver using an adaptive beamforming process, wherein said transmit calibration result is utilized in the adaptive beamforming process.

9. The subsystem according to claim 1 further comprising a printed circuit board for coupling the multiplicity of modulated signals to said combiner, said combiner including a multiplicity of micro strip lines incorporated into said printed circuit board and corresponding to each of the multiplicity of modulated signals for coupling each of the multiplicity of modulated signals into said combiner, whereby variations in characteristics of said printed circuit board substantially equally affect the power level and phase of the multiplicity of information signals detected by said detector.

10. The subsystem according to claim 9 wherein said combiner consists essentially entirely of micro strip lines.

11. The subsystem according to claim 1 further wherein:

said multiplicity of transmitters are mounted on a plurality of modules and the subsystem further comprises a back plane for affixing said plurality of modules and for coupling the multiplicity of modulated signals to an antenna array and for coupling the multiplicity of modulated signals to said combiner, wherein said back plane includes a printed circuit board, and said combiner including a multiplicity of micro strip lines incorporated into said printed circuit board and corresponding to each of the multiplicity of modulated signals for coupling each of the multiplicity of modulated signals to said combiner, whereby variations in characteristics of said printed circuit board substantially equally affect the power level and phase of the multiplicity of information signals detected by said detector.

12. The subsystem according to claim 1 comprising:

an antenna array mount for mounting each element of an antenna array and for coupling the multiplicity of modulated signals to said combiner; and a multiplicity of transmission lines for coupling each of said multiplicity of modulated signals to a corresponding element of the antenna array through said antenna array mount.

13. The subsystem according to claim 12 wherein said antenna array mount includes a printed circuit board including a multiplicity of micro strip lines corresponding to each of the multiplicity of modulated signals for coupling each of the multiplicity of modulated signals to said combiner, whereby variations in characteristics of said printed circuit board substantially equally affect the power level and phase of the multiplicity of information signals detected by said detector.

14. The subsystem according to claim 12 wherein said multiplicity of transmission lines couple a first portion of each of said multiplicity of transmitters to a second portion of each of said multiplicity of transmitters wherein said second portion is located in close proximity to said antenna array mount and said first portion is located in close proximity to said signal generator.

15. The subsystem according to claim 12 further comprising a back plane located in close proximity to said signal generator for coupling the multiplicity of modulated signals to said transmission lines and for coupling the multiplicity of modulated signals to said combiner, wherein said combiner further comprises:

a first combiner coupled to said antenna array mount;

a second combiner coupled said back plane; and a switch for selective coupling the first or second combiner to said detector.

16. The subsystem according to claim 15 wherein each of said multiplicity of transmitters includes a first portion coupled between said first combiner and said multiplicity of transmission lines and a second portion coupled between said second combiner and said signal generator wherein said first portion includes an amplifier, and said second portion includes a modulator.

17. An antenna array subsystem comprising:

a modulator for producing a first modulated signal having an information signal modulated thereupon;

a splitter coupled to said modulator for splitting the first modulated signal into a multiplicity of modulated signals;

a multiplicity of receivers correspondingly coupled to said splitter for demodulating each of the multiplicity of modulated signals to produce a corresponding multiplicity of information signals; and a detector coupled to said multiplicity of receivers for determining a power level and a phase for each of the multiplicity of information signals.

18. The subsystem according to claim 17 wherein
the information signal includes a spread spectrum signal, and
said detector includes a spread spectrum detector for determining the power and phase of each of the multiplicity of information signals.

19. The subsystem according to claim 17 wherein
the information signal includes a sine wave signal, and
said detector includes a sine wave detector for determining the power and phase of each of the multiplicity of information signals.

20. The subsystem according to claim 17 further comprising
a calibrator coupled to said detector for generating a receive calibration result for compensating for gain and phase characteristics of the subsystem in response to each of the multiplicity of information signals detected by said detector.

21. The subsystem according to claim 20 wherein
said splitter has a predetermined gain and phase modification upon each of the multiplicity of modulated signals and further wherein
said calibrator accounts for the predetermined gain and phase modification in the generation of the receive calibration result.

22. The subsystem according to claim 21 wherein the subsystem is coupled to an antenna array for receiving information from a remote receiver using an adaptive beamforming process, wherein the receive calibration result is utilized in the adaptive beamforming process.

23. The subsystem according to claim 17 further comprising
a printed circuit board for coupling the multiplicity of modulated signals to said splitter,
said splitter including a multiplicity of micro strip lines incorporated into said printed circuit board and corresponding to each of the multiplicity of modulated signals for coupling each of the multiplicity of modulated signals to said splitter,
whereby variations in characteristics of said printed circuit board substantially equally affect the power level and phase of the multiplicity of information signals detected by said detector.

24. The subsystem according to claim 17 further wherein:
said multiplicity of receivers are mounted on a plurality of modules and the subsystem further comprises
a back plane for affixing said plurality of modules and for coupling the multiplicity of modulated signals to said splitter, wherein
said back plane includes a printed circuit board and
said splitter includes a multiplicity of micro strip lines incorporated into said printed circuit board and corresponding to each of the multiplicity of modulated signals for coupling each of the multiplicity of modulated signals to said splitter,
whereby variations in characteristics of said printed circuit board substantially equally affect the power level and phase of the multiplicity of information signals detected by said detector.

25. The subsystem according to claim 17 comprising:
an antenna array mount for mounting each element of an antenna array and for coupling the multiplicity of modulated signals to said splitter; and
a multiplicity of transmission lines for coupling each of said multiplicity of modulated signals to said corresponding multiplicity of receivers.

26. The subsystem according to claim 25 wherein
said antenna array mount includes a printed circuit board and
said splitter includes a multiplicity of micro strip lines incorporated into said printed circuit board and corresponding to each of the multiplicity of modulated signals for coupling each of the multiplicity of modulated signals to said splitter,
whereby variations in characteristics of said printed circuit board substantially equally affect the power level and phase of the multiplicity of information signals detected by said detector.

27. The subsystem according to claim 25 wherein
said multiplicity of transmission lines couple a first portion of each of said multiplicity of receivers to a second portion of each of said multiplicity of receivers wherein said first portion is located in close proximity to said antenna array mount and said second portion is located in close proximity to said detector.

28. The subsystem according to claim 25 further comprising
a back plane located in close proximity to said detector for coupling the multiplicity of modulated signals to said multiplicity of transmission lines and for coupling the multiplicity of modulated signals to said splitter, wherein said splitter further comprises:
a first splitter coupled to said antenna array mount;
a second splitter coupled said back plane; and
a switch for selective coupling said first or second splitter to said detector.

29. The subsystem according to claim 17 further comprising:
a time division duplex controller for controlling communication of the subsystem with a remote terminal and for causing the subsystem to:
transmit information to the remote terminal in transmit time slots occurring at periodic intervals;
receive information from the remote terminal in receive time slots using said multiplicity of receivers, the receive time slots interposed between the transmit time slots; and in response to an absence of communication with the remote terminal to
enable said modulator, said splitter, said multiplicity of receivers and said detector to determine the power level and the phase for each of the multiplicity of information signals during a transmit time slot.

30. An antenna array subsystem comprising:
a signal generator for simultaneously generating a multiplicity of information signals, each of the multiplicity of information signals having individually identifiable characteristics;
a multiplicity of transmitters coupled to said signal generator for producing a corresponding multiplicity of modulated signals modulated at a common carrier frequency;
a combiner coupled to said multiplicity of transmitters for combining the multiplicity of modulated signals to produce a combined modulation signal;
a demodulator coupled to said combiner for demodulating the combined modulation signal to produce a demodulated signal including the multiplicity of information signals;
a transmit detector coupled to said demodulator for processing the demodulated signal to determining a power level and a phase for each of the multiplicity of information signals;

a modulator for producing a first modulated signal having a second information signal modulated thereupon;

a splitter coupled to said modulator for splitting the second modulated signal into a multiplicity of second modulated signals;

a multiplicity of receivers correspondingly coupled to said splitter for demodulating each of the multiplicity of second modulated signals to produce a corresponding multiplicity of second information signals;

a receive detector coupled to said demodulator for determining a power level and a phase for each of the multiplicity of second information signals; and a controller for activating said signal generator, said multiplicity of transmitters, said combiner, said demodulator and said transmit detector during a transmit calibration mode and for activating said modulator, said splitter, said multiplicity of receivers and said receive detector during a receive calibrate mode.

31. The subsystem according to claim 30 wherein said combiner and said splitter are combined and comprised of identical components, thereby canceling differences in gain and phase characteristics due to differences in said combiner and said splitter when determining a ratio for transmit and receive power level and phases.

32. The subsystem according to claim 31 wherein said combined splitter and combiner have micro strip line components incorporated within a common printed circuit board for coupling the multiplicity of modulated signals and the multiplicity of second modulated signals to and from said combined splitter and combiner, whereby variations in characteristics of said printed circuit board substantially equally affect the power level and phase of the multiplicity of information signals detected by said detector.

* * * * *